US009999005B2

United States Patent
Callender et al.

(10) Patent No.: US 9,999,005 B2
(45) Date of Patent: Jun. 12, 2018

(54) METHOD AND APPARATUS FOR ENHANCED SECONDARY CELL ACTIVATION AND DEACTIVATION

(71) Applicant: Avago Technologies General IP (Singapore) Pte. Ltd., Singapore (SG)

(72) Inventors: Christopher Callender, Kinross (GB); Wei Bai, Beijing (CN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days. days.

(21) Appl. No.: 14/891,888

(22) PCT Filed: May 20, 2013

(86) PCT No.: PCT/CN2013/075900
§ 371 (c)(1),
(2) Date: Nov. 17, 2015

(87) PCT Pub. No.: WO2014/186932
PCT Pub. Date: Nov. 27, 2014

(65) Prior Publication Data
US 2016/0128003 A1 May 5, 2016

(51) Int. Cl.
*H04W 52/36* (2009.01)
*H04W 72/04* (2009.01)
(Continued)

(52) U.S. Cl.
CPC ......... *H04W 52/365* (2013.01); *H04W 16/32* (2013.01); *H04W 24/02* (2013.01);
(Continued)

(58) Field of Classification Search
CPC ........... H04W 52/365; H04W 52/0261; H04W 52/146; H04W 52/367; H04W 24/02;
(Continued)

(56) References Cited

U.S. PATENT DOCUMENTS 7,711,367 B2 * 5/2010 Cheng .................. H04W 36/30
370/332
8,676,252 B2 * 3/2014 Noh ........................ H04L 12/66
370/228
(Continued)

FOREIGN PATENT DOCUMENTS

EP 2383927 11/2011
WO WO-2011/159222 12/2011
(Continued)

OTHER PUBLICATIONS

International Search Report for PCT/CN2013/075900 dated Feb. 27, 2014.
(Continued)

*Primary Examiner* — Jamal Javaid
(74) *Attorney, Agent, or Firm* — Foley & Lardner LLP

(57) ABSTRACT

A method, apparatus and computer program product are provided in order to enhance network notification of secondary cell activation. In a first embodiment, the method includes receiving a secondary cell activation command, activating a secondary cell, and transmitting a PHR indicating activation of the secondary cell. In a second embodiment, the method includes receiving a secondary cell activation command, activating a secondary cell, and transmitting a signal indicating an expected time period until activation of the secondary cell. In a third embodiment, the method may optimize implicit SCell deactivation by receiving a secondary cell activation command, activating a secondary cell, receiving a PDCCH order for an uplink grant or a downlink assignment, and starting a secondary cell deactivation timer associated with the secondary cell in response to receiving the PDCCH order. A corresponding apparatus and computer program product are also provided.

18 Claims, 8 Drawing Sheets

(51) Int. Cl.
  *H04W 24/02* (2009.01)
  *H04W 16/32* (2009.01)
  *H04W 52/02* (2009.01)

(52) U.S. Cl.
  CPC ..... *H04W 52/0261* (2013.01); *H04W 72/042* (2013.01); *H04W 52/0206* (2013.01); *Y02B 60/50* (2013.01)

(58) Field of Classification Search
  CPC ........... H04W 72/042; H04W 72/0413; H04W 16/32
  See application file for complete search history.

(56) References Cited

U.S. PATENT DOCUMENTS

| 2011/0134774 | A1 | 6/2011 | Pelletier et al. | |
| 2011/0243106 | A1* | 10/2011 | Hsu | H04L 5/0096 370/336 |
| 2012/0281544 | A1* | 11/2012 | Anepu | H04B 7/0632 370/241 |

FOREIGN PATENT DOCUMENTS

| WO | WO-2012/107912 | 8/2012 |
| WO | WO-2012/136128 | 10/2012 |

OTHER PUBLICATIONS

Written Opinion of the Searching Authority for PCT/CN2013/075900 dated Feb. 27, 2014.
International Preliminary Report on Patentability for PCT/CN2013/075900 dated Nov. 24, 2015.

* cited by examiner

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type 1, PCell)} |
| R | R | \multicolumn{6}{c}{$P_{CMAX,c}$ 2} |
| P | V | \multicolumn{6}{c}{PH (Type 1, SCell 1)} |
| R | R | \multicolumn{6}{c}{$P_{CMAX,c}$ 3} |

...

| P | V | PH (Type 1, SCell n) |
|---|---|---|
| R | R | $P_{CMAX,c}$ m |

FIG. 3

METHOD AND APPARATUS FOR ENHANCED SECONDARY CELL ACTIVATION AND DEACTIVATION

RELATED APPLICATIONS

This application is a U.S. National Stage of and claims priority to and the benefit of International Application Number PCT/CN2013/075900, filed May 20, 2013. The entire contents of the foregoing are hereby incorporated herein by reference for all purposes.

TECHNOLOGICAL FIELD

Embodiments of the present invention relate generally to communications technology and, more particularly, to a method and apparatus enabling enhanced secondary cell activation and deactivation.

BACKGROUND

Carrier aggregation (CA) is one of the key technologies in Release 10/11 (Rel-10) of the $3^{rd}$ generation partnership project (3GPP), and is used to increase the throughput for user equipment (UE) to suit the increasing demands for higher the data rates. Inter-frequency band carrier aggregation and intra-frequency band carrier aggregation are both supported by the CA UEs. For carrier aggregation, there are two kinds of cells called primary cells (PCells) and secondary cells (SCells). The UE will first access the PCells via legacy procedure (e.g., a procedure in accordance with 3GPP Release 8) and after that, once the evolved Node B (eNB) sees the need to extend the throughput, it could configure one or more SCells for the UE.

However, for UE configured with carrier aggregation, power consumption performance need to be considered. Quick SCell activation/deactivation was introduced in 3GPP Rel-10. When a UE has a large amount of data to transmit, the eNB can activate the SCell for radio resource extension; when the UE has less data to transmit, the eNB can deactivate the SCell to save UE power. An eNB could thus use an activation/deactivation media access control (MAC) control element (CE) to activate/deactivate the SCell. In addition, the UE also includes an implicit deactivation method (e.g., sCellDeactivationTimer), which can deactivate the SCell in case the MAC CE is lost at the UE and there was NACK to ACK error.

Accordingly, SCell activation and deactivation has become an area of increasing focus. In particular, issues have emerged as a result of variable activation timing of SCells. In 3GPP Rel-10, it was assumed that SCells could be activated relatively quickly. For example, if a MAC CE command implying activation was received on subframe n, then it was assumed that the activation of the SCell would be complete by subframe n+8.

However, as more detailed work has been performed, there are more challenging cases where user equipment (UE) algorithms (such as automatic gain control (AGC)) could cause activation of the SCell to take longer than this duration. Other examples of more challenging cases are when there is a time-division duplex (TDD) configuration which has mostly uplink subframes, or for frequency division duplexing (FDD), when multi-broadcast single frequency network (MBSFN) subframes occur around the activation time. An additional issue that was discovered was the so-called "blind" activation case, where the eNB configures and immediately activates an SCell which has not been previously measured by the UE. In this case, the UE needs to perform primary synchronization signal (PSS)/secondary synchronization signal (SSS) timing acquisition. As a result of these potential delays in SCell activation, standards discussions have moved in the direction of specifying generic minimum performance requirements for SCell activation, although in many cases it is likely that a UE could activate the SCell more quickly than the generic minimum performance requirement.

As mentioned previously, during the initial 3GPP Rel-10 discussion, it was agreed that a UE should finish the activation/deactivation procedure in 8 milliseconds (ms), meaning that if the UE receives an SCell activation/deactivation MAC CE at subframe n, the SCell should be ready at subframe n+8. However, some commentators have noted that 8 ms is not enough for every practical use case. However, lengthening the expected activation time will potentially reduce the likelihood of using activation/deactivation to control UE power consumption. Moreover, lengthening the expected activation time could cause unnecessary idle time when the SCell is ready more quickly without knowledge of the network. Accordingly, better communication of actual SCell activation/deactivation times could mitigate these issues, reduce idle downtime, and thus enhance system performance.

BRIEF SUMMARY

A method, apparatus and computer program product are provided according to one embodiment of the present invention in order to enhance activation and deactivation of secondary cell activation. Concepts of the present invention enable alignment of the knowledge of secondary cell activation and deactivation by both the eNB and UE.

In a first example embodiment, a method is provided for use with a communication device connected to a primary cell and at least one secondary cell. The method includes causing the communication device to activate a secondary cell, and causing the communication device to transmit a signal regarding activation of the secondary cell, wherein the signal comprises a power headroom report (PHR) or an indication of an estimated expected time period after which a secondary cell will be ready for use.

In one embodiment, the signal may comprise a PHR transmitted after receiving a secondary cell activation command, and the signal may include information indicating that the PHR was transmitted in response to completion of activation of the secondary cell.

In another embodiment, the method further includes receiving an indication that the secondary cell is ready for use, wherein the PHR indicates that the secondary cell is active, and wherein the step of causing the communication device to transmit the signal is performed in response to receiving the indication that the secondary cell is ready for use.

In another embodiment, the method includes transmitting a valid channel quality indicator (CQI) or sounding reference signal (SRS), wherein the PHR indicates that the secondary cell is active, and wherein the step of causing the communication device to transmit the signal is performed in response to transmitting the valid CQI or SRS.

In another embodiment, the method includes estimating the expected time period after which a secondary cell will be ready for use, causing the communication device to transmit an indication of the estimated expected time period, wherein the signal comprises an indication of the estimated time period after which the secondary cell will be ready for use.

In this regard, estimating the expected time period may be performed in response to receiving a secondary cell activation command. Alternatively, estimating the expected time period may be performed prior to receiving a secondary cell activation command. In addition, causing the communication device to transmit the signal may also be performed prior to receiving a secondary cell activation command. The indication of the expected time period may comprise an index reference to a group of preconfigured time periods or a measurement in units of time. More specifically, the units of time may be milliseconds. Moreover, the communication device may be a mobile phone.

In another example embodiment, an apparatus is provided for use with a communication device connected to a primary cell and at least one secondary cell. The apparatus includes at least one processor and at least one memory including computer program code, the at least one memory and the computer program code configured to, with the at least one processor, cause the communication device to activate a secondary cell, and transmit a signal regarding activation of the secondary cell, wherein the signal may comprise a PHR or an indication of an estimated expected time period after which a secondary cell will be ready for use.

In another example embodiment, a computer program product is provided for use with a communication device connected to a primary cell and at least one secondary cell. The computer program product includes at least one computer readable storage medium storing computer readable instructions that, when executed, cause the communication device to activate a secondary cell, and transmit a signal regarding activation of the secondary cell, wherein the signal may comprise a PHR or an indication of an estimated expected time period after which a secondary cell will be ready for use.

In another example embodiment, an apparatus is provided for use with a communication device connected to a primary cell and at least one secondary cell. The apparatus includes means for activating a secondary cell, and means for causing the communication device to transmit a signal regarding activation of the secondary cell, wherein the signal may comprise a PHR or an indication of an estimated expected time period after which a secondary cell will be ready for use. In another example embodiment, a method is provided for use with an access point connected to a communication device. The method includes receiving a signal regarding activation of the secondary cell, wherein the signal comprises a PHR or an indication of an estimated expected time period after which a secondary cell will be ready for use, and determining that the secondary cell is ready for use based on the received signal.

In one embodiment, the signal may comprise a PHR received after transmission of a secondary cell activation command, and the signal may include information indicating that the PHR was transmitted in response to completion of activation of the secondary cell.

In one embodiment, the signal may indicate that the secondary cell is active and may be received in response to the communication device receiving an indication that the secondary cell is ready for use. In another embodiment, the signal may indicate that the secondary cell is active and may be received in response to the communication device transmitting a valid CQI or SRS.

In some embodiments, the signal regarding activation of the secondary cell includes an indication of an estimated expected time period after which the secondary cell will be ready for use. In this regard, the signal may be received prior to transmission of a secondary cell activation command, or after transmission of a secondary cell activation command. Moreover, the indication of the expected time period may include an index reference to a group of preconfigured time periods or a measurement in units of time. More specifically, the units of time may be milliseconds. In addition, the communication device may be a mobile phone.

In another example embodiment, an apparatus is provided for use with an access point connected to a communication device. The apparatus includes at least one processor and at least one memory including computer program code, the at least one memory and the computer program code configured to, with the at least one processor, cause the apparatus to receive a signal regarding activation of the secondary cell, wherein the signal comprises a PHR or an indication of an estimated expected time period after which a secondary cell will be ready for use, and determine that the secondary cell is ready for use based on the received signal.

In another example embodiment, a computer program product is provided for use with an access point connected to a communication device. The computer program product includes at least one computer readable storage medium storing computer readable instructions that, when executed, cause an apparatus to receive a signal regarding activation of the secondary cell, wherein the signal comprises a PHR or an indication of an estimated expected time period after which a secondary cell will be ready for use, and determine that the secondary cell is ready for use based on the received signal.

In another example embodiment, an apparatus is provided for use with an access point connected to a communication device. The apparatus includes means for receiving a signal regarding activation of the secondary cell, wherein the signal comprises a PHR or an indication of an estimated expected time period after which a secondary cell will be ready for use, and means for determining that the secondary cell is ready for use based on the received signal.

In yet another example embodiment, a method is provided for use with a communication device connected to a primary cell and at least one secondary cell. The method includes receiving a secondary cell activation command, causing the communication device to activate a secondary cell, receiving a physical downlink control channel (PDCCH) order for an uplink grant or a downlink assignment, and causing the communication device to start a secondary cell deactivation timer associated with the secondary cell in response to receiving the PDCCH order. The method may further include restarting the secondary cell deactivation timer in response to receiving a subsequent secondary cell activation command or a subsequent PDCCH order for an uplink grant or a downlink assignment.

In another example embodiment, an apparatus is provided for use with a communication device connected to a primary cell and at least one secondary cell. The apparatus may include at least one processor and at least one memory including computer program code, the at least one memory and the computer program code configured to, with the at least one processor, cause the apparatus to receive a secondary cell activation command, activate a secondary cell, receive a PDCCH order for an uplink grant or a downlink assignment, and start a secondary cell deactivation timer associated with the secondary cell in response to receiving the PDCCH order. In some embodiments, the at least one memory and the computer program code are further configured to, with the at least one processor, cause the apparatus to restart the secondary cell deactivation timer in response to receiving a subsequent secondary cell activation command or a subsequent PDCCH order for an uplink grant or a downlink assignment.

In another example embodiment, a computer program product is provided for use with a communication device connected to a primary cell and at least one secondary cell. The computer program product may include at least one computer readable storage medium storing computer readable instructions that, when executed, cause the communication device to receive a secondary cell activation command, activate a secondary cell, receive a PDCCH order for an uplink grant or a downlink assignment, and start a secondary cell deactivation timer associated with the secondary cell in response to receiving the PDCCH order. In some embodiments, the computer readable instructions, when executed, further cause the communication device to restart the secondary cell deactivation timer in response to receiving a subsequent secondary cell activation command or a subsequent PDCCH order for an uplink grant or a downlink assignment.

In another example embodiment, an apparatus is provided for use with a communication device connected to a primary cell and at least one secondary cell. The apparatus includes means for receiving a secondary cell activation command, means for activating a secondary cell, means for receiving a physical downlink control channel (PDCCH) order for an uplink grant or a downlink assignment, and means for causing the communication device to start a secondary cell deactivation timer associated with the secondary cell in response to receiving the PDCCH order. In some embodiments, the apparatus further includes means for restarting the secondary cell deactivation timer in response to receiving a subsequent secondary cell activation command or a subsequent PDCCH order for an uplink grant or a downlink assignment.

BRIEF DESCRIPTION OF THE DRAWINGS

Figure 1:
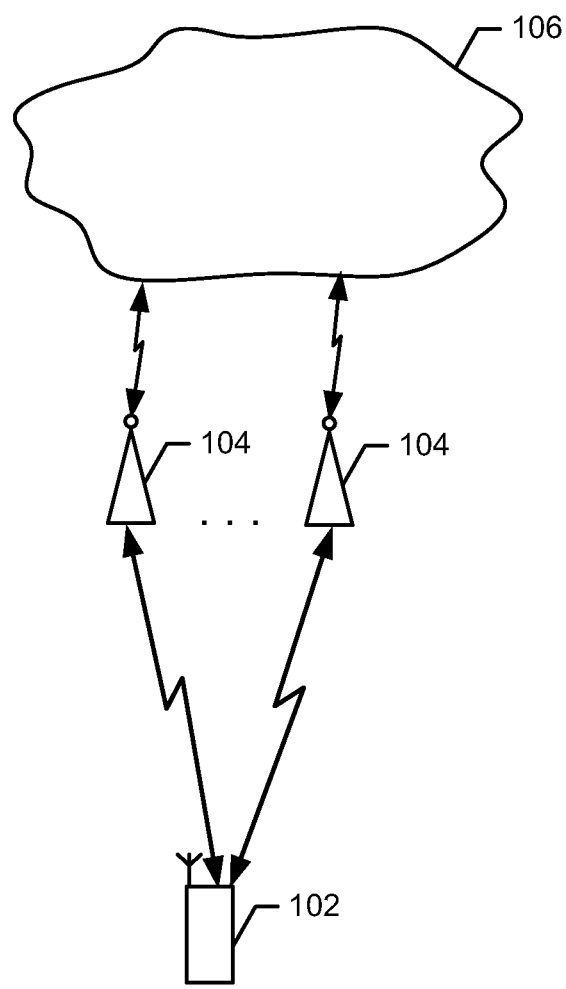
Figure 2:
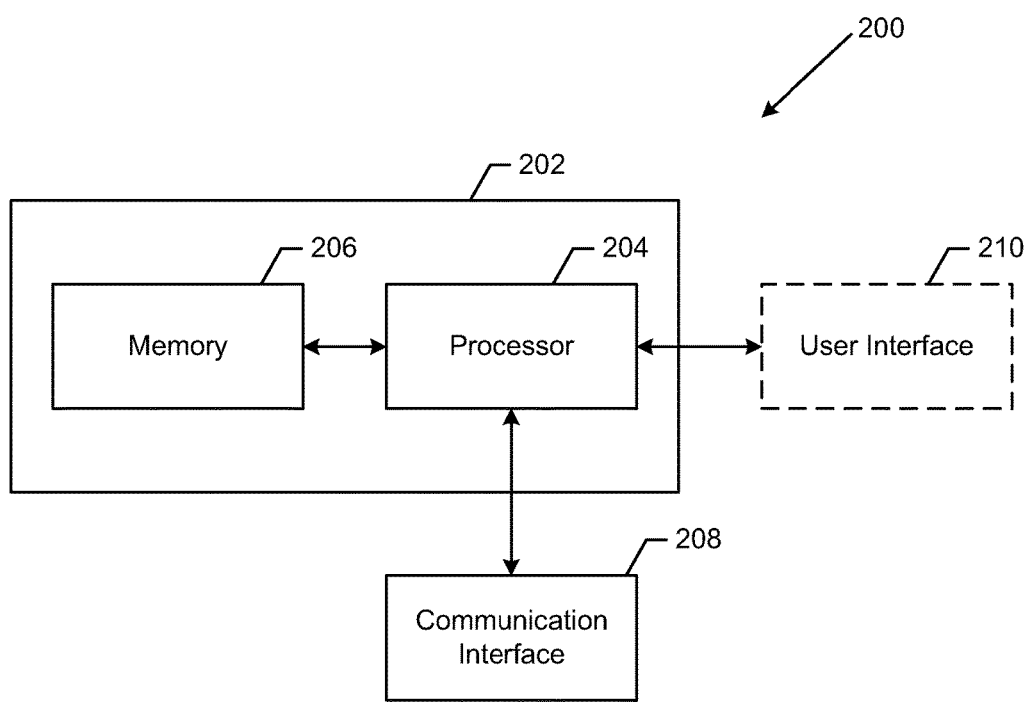
Figure 4:
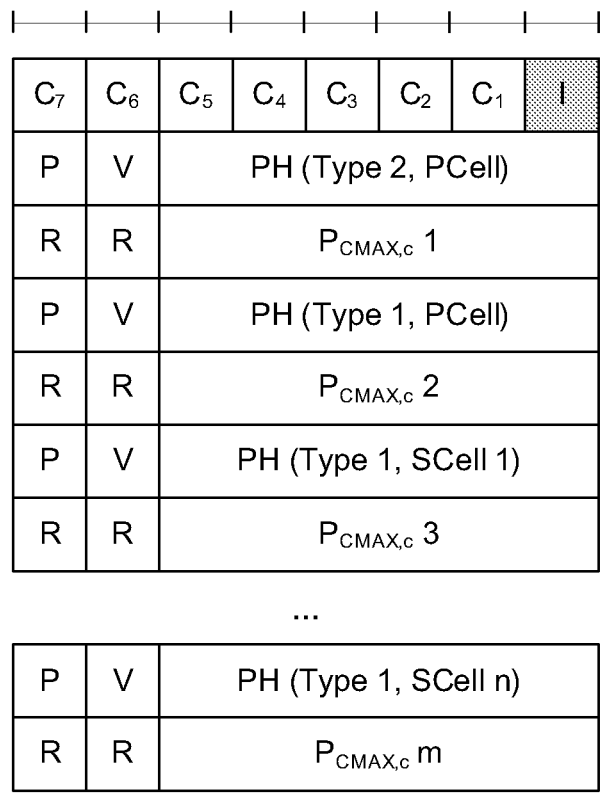
Figure 5A:
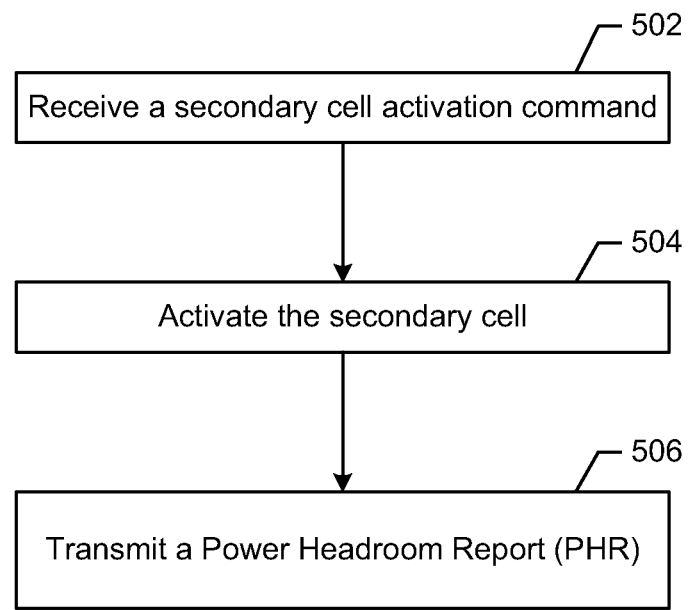
Figure 5B:
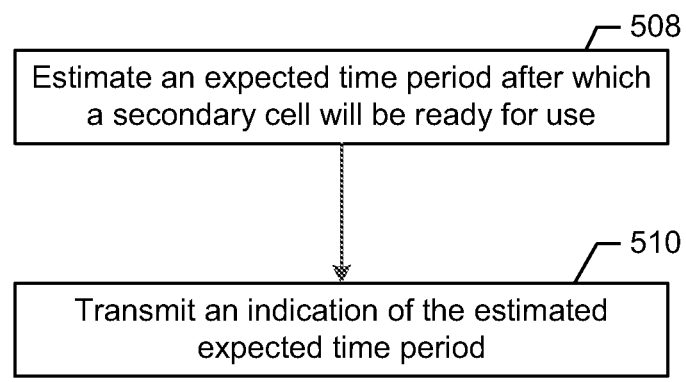
Figure 6:
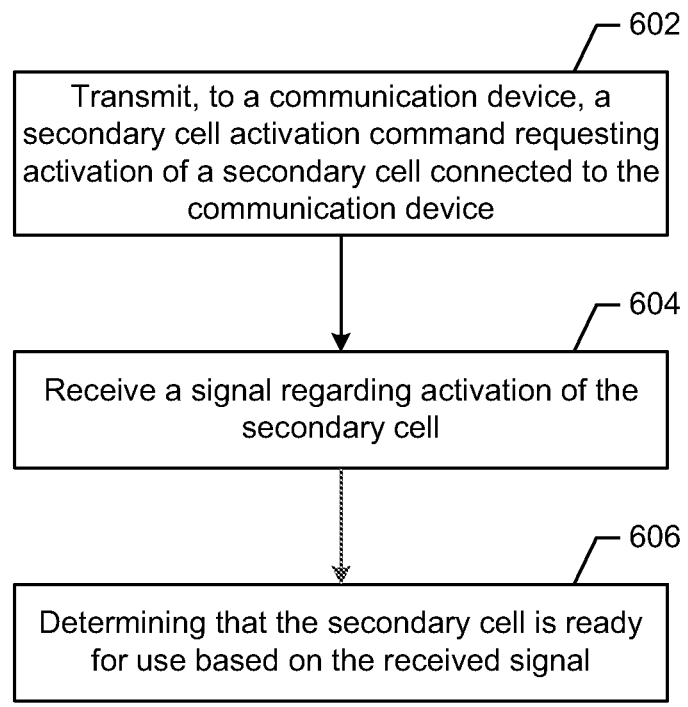
Figure 7:
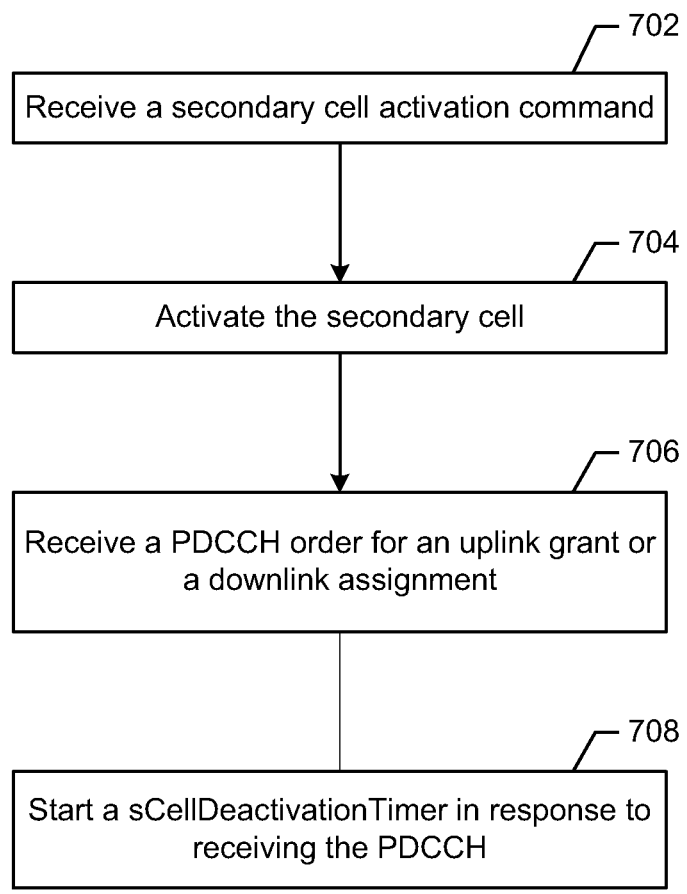

Having thus described the example embodiments of the invention in general terms, reference will now be made to the accompanying drawings, which are not necessarily drawn to scale, and wherein:

FIG. 1 is a schematic representation of a system having a communication device that may perform enhanced secondary cell activation and deactivation;

FIG. 2 is a block diagram of an apparatus that may be embodied by a communication device, in accordance with some example embodiments of the present invention;

FIG. 3 comprises a diagram of the existing Extended Power Headroom MAC Control Element format;

FIG. 4 illustrates a diagram of an example revised Extended Power Headroom MAC Control Element format, in accordance with some example embodiments of the present invention;

FIG. 5a is a flow chart illustrating operations for enhanced secondary cell activation performed by a communication device, in accordance with some example embodiments of the present invention;

FIG. 5b is a flow chart illustrating additional operations for enhanced secondary cell activation performed by a communication device, in accordance with some example embodiments of the present invention;

FIG. 6 is a flow chart illustrating operations for enhanced secondary cell activation performed by an example network entity, in accordance with some example embodiments of the present invention; and FIG. 7 is a flow chart illustrating additional operations for enhanced secondary cell deactivation performed by an example communication device, in accordance with some example embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Although the method, apparatus and computer program product may be implemented in a variety of different system architectures, one example of a system that may be specifically configured in order to implement an example embodiment of the present invention is shown in FIG. 1.

Referring now to FIG. 1, a system is shown that supports communications between a plurality of communication devices 102 (one of which is illustrated by way of example) and a network 106, such as an 802.11 network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network, via an access point 104.

The network 106 may include a collection of various different nodes, devices or functions that may be in communication with each other via corresponding wired and/or wireless interfaces. For example, the network may include one or more cells, of which a first cell is a primary cell (PCell) and the other cells are secondary cells (SCells). Each cell may include an access point 104 and may serve a respective coverage area. The access point 104 could be, for example, part of one or more cellular or mobile networks or public land mobile networks (PLMNs). In turn, other devices such as processing devices (e.g., personal computers, server computers or the like) may be coupled to the communication device 102 and/or other communication devices via the network.

A communication device, such as the communication device 102 (also known as user equipment (UE), a mobile terminal, or the like), may be in communication with other communication devices or other devices via the access point 104 of a cell and, in turn, the network 106. In some cases, the communication device 102 may include an antenna for transmitting signals to and for receiving signals from an access point 104. The communication device 102 may in some instances be simultaneously connected to multiple access points 104, including an access point 104 of a PCell, and access points 104 of one or more SCells, as shown in the example of FIG. 1. As is described herein the communication device 102 and/or the access point 104 may take the form of a transmitter and/or receiver.

In some example embodiments, the communication device 102 may be a mobile communication device such as, for example, a mobile telephone, portable digital assistant (PDA), pager, laptop computer, STA, or any of numerous other hand held or portable communication devices, computation devices, content generation devices, content consumption devices, or combinations thereof. However, as is described herein, the communication device 102 may also take the form of a communications enabled appliance, such as a thermostat configured to connect with an access point 104. Other such devices that are configured to connect to the network include, but are not limited to a refrigerator, a security system, a home lighting system, and/or the like. As such, the communication device 102 may include one or more processors that may define processing circuitry and a processing system, either alone or in combination with one or more memories. The processing circuitry may utilize instructions stored in the memory to cause the communication device 102 to operate in a particular way or execute specific functionality when the instructions are executed by the one or more processors. The communication device 102 may also include communication circuitry and corresponding hardware/software to enable communication with other devices and/or the network 106. Regardless of the type of communication device, the communication device may communicate with a given cell via an access point 104, such as a base station, a Node B, an evolved Node B (eNB), a relay node or an 802.11 or other type of access point.

The communication device 102 and a network entity, such as an eNB, or link, that manages the access point 104 of a cell, may each embody or otherwise be associated with an apparatus 200 that is generally depicted in FIG. 2 and that may be configured to perform various operations in accordance with an example embodiment of the present invention as described below, such as in conjunction with FIGS. 5a, 5b, and 7 from the perspective of a communication device 102, and FIG. 6 from the perspective of a network entity. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 200 may include or otherwise be in communication with a processing system including, for example, processing circuitry 202 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 202 may include a processor 204 and memory 206 that may be in communication with or otherwise control a communication interface 208 and, in some cases in which the apparatus is embodied by the communication device 102, a user interface 210. As such, the processing circuitry may be embodied as a circuit chip (e.g., an integrated circuit chip) configured (e.g., with hardware, software or a combination of hardware and software) to perform operations described herein. However, in some embodiments, the processing circuitry may be embodied as a portion of mobile terminal or the access point.

The user interface 210 (if implemented) may be in communication with the processing circuitry 202 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 200 need not always include a user interface. For example, in instances in which the apparatus is embodied as an access point 104 of a cell, the apparatus may not include a user interface. As such, the user interface is shown in dashed lines in FIG. 2.

The communication interface 208 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 106 and/or any other device or module in communication with the processing circuitry 202, such as between the communication device 102 and the access point 104. In this regard, the communication interface may include, for example, an antenna (or multiple antennas) and support hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 206 may include one or more non-transitory memory devices such as, for example, volatile and/or non-volatile memory that may be either fixed or removable. The memory may be configured to store information, data, applications, instructions or the like for enabling the apparatus 200 to carry out various functions in accordance with example embodiments of the present invention. For example, the memory could be configured to buffer input data for processing by the processor 204. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 204 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 206 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As previously noted, given the additional delays which may occur in SCell activation compared that those which were first envisaged for rel-10 carrier aggregation, a risk has emerged that SCell deactivation will not be used. However, by providing further visibility to the eNB of the actual UE activation performance (rather than the generic delays considering worst case configurations), embodiments of the present invention make it more attractive for networks to perform SCell deactivation and provide benefits for UE power consumption.

As noted previously, 8 ms may not be a sufficient amount of time to finish activation/deactivation of an SCell in the following situations:

Warm start: where the UE radio frequency (RF) is activated and the UE knows the SCell timing;

Cold start 1: where the UE RF is not activated and the UE doesn't know the SCell timing (blind SCell activation); and Cold start 2: where the UE RF is not activated, but knows the SCell timing.

The outcome of recent standards discussions was that the worst case activation delay for the SCell is 24 ms when the SCell timing is known. For unknown SCell timing, though, if the first attempt on the synchronization signal monitoring is successful, the delay will be up to 34 ms. Moreover, in the case that the UE fails in its first attempt at synchronization signal monitoring, the activation delay could be up to 280 ms according to recent simulation results.

According to recent discussions, the working assumption has been made that for warm start and cold start 2 scenarios, the SCell activation delay will be up 24 ms, which is much longer than the current value 8 ms. In practice, though, a UE may have a shorter UE SCell activation delay than the UE SCell activation delay specified in the minimum requirements (e.g., before the timing in the minimum requirement but after N+8 (N is the subframe when the SCell activation command is received by UE)). Both the UE and the network should be able to benefit from the reduced SCell activation delay by the UE, which enables the activated state operations defined in 3GPP TS 36.321, including operations to:

activate the SCell; e.g., apply normal SCell operations including:
SRS transmissions on the SCell;
CQI/PMI/RI/PTI reporting for the SCell;
PDCCH monitoring on the SCell;
PDCCH monitoring for the SCell; and start or restart the sCellDeactivationTimer associated with the SCell.

However, because this 24 ms delay is mainly used to account for potential delaying impacts, such as using a TDD system, or having a MBSFN subframe configuration, etc., the actual SCell activation delay will be shorter for most of the cases. Accordingly, the UE and the eNB could benefit if the SCell could be activated earlier (e.g., so-called early activation). In this regard, early activation would mean that the UE is allowed to monitor PDCCH, transmit SRS/CSI, etc., before the 24 ms delay has completed, if the SCell is ready to use. To benefit from early activation, though, the eNB has to know, before completion of the 24 ms delay, when the UE is ready. Using existing standards, there might be following potential solutions:

1. When eNB receives first valid channel state information (CSI) report, it will regard the SCell is ready;
2. The eNB will know that SCell is ready by reading the power headroom report (PHR);
3. The eNB could schedule aperiodic channel quality indicator (CQI) reports for the PCell to check whether the SCell is ready; or
4. The eNB could do blind scheduling before 24 ms.

The above four solutions will not require any changes to the standards specification; however, they have drawbacks.

The first solution will require a densely configured physical uplink control channel (PUCCH), which will be a restriction to the eNB. In addition, because the smallest periodicity of PUCCH is 10 ms, this may not provide timely information.

The second solution may work well because a PHR will be triggered upon SCell activation and the eNB could understand whether the SCell is ready by reading the bitmap in the extended PHR. However, only those SCells configured for uplink (UL) will trigger a PHR, so the use case may be quite limited. Specifically, 2DL/1UL carrier aggregation UEs do not send PHR reports on SCell activation.

For the third solution, the eNB will send the CQI request blindly so there might be a waste of PDCCH and UL resource. For instance, the CQI report for the SCell may return "out of range" prior to activation and therefore does not provide additional information, yet still requires network resources.

Finally, the fourth solution differs from the third solution in that the eNB determines that the UE is ready by a successful ACK/NACK response to scheduled data, or if there is UL transmission on the scheduled UL resource, rather than an aperiodic CQI report. Nevertheless, the fourth solution has the same potential for resource waste as the third solution.

Therefore, for these reasons, implementation based solution are sub-optimal, and accordingly make efficiency improvements from early activation of an SCell difficult to achieve.

Accordingly, updates to the standard specification may enable enhanced activation/deactivation of SCells. For instance, the following is a description of PHR triggering from the Rel-10 3GPP TS 36.321 states that a Power Headroom Report (PHR) shall be triggered if any of the following events occur:

prohibitPHR-Timer expires or has expired and the path loss has changed more than dl-PathlossChange dB for at least one activated Serving Cell which is used as a pathloss reference since the last transmission of a PHR when the UE has UL resources for new transmission;

periodicPHR-Timer expires;

upon configuration or reconfiguration of the power headroom reporting functionality by upper layers [8], which is not used to disable the function;

activation of an SCell with configured uplink.

prohibitPHR-Timer expires or has expired, when the UE has UL resources for new transmission, and the following is true in this TTI for any of the actived Serving Cells with configured uplink:

there are UL resources allocated for transmission or there is a PUCCH transmission on this cell, and the required power backoff due to power management (as allowed by P-MPR$_c$ [10]) for this cell has changed more than dl-PathlossChange dB since the last transmission of a PHR when theUE had UL resources allocated for transmission or PUCCH transmission on this cell.

However, as detailed above, a PHR cannot align the knowledge of the eNB and the UE, because the PHR is transmitted upon reception of the activation command (when the activation process is only beginning), and therefore the PHR will not be able to indicate the subframe when the SCell is ready for use. Moreover, a PHR is not transmitted for an SCell without configured uplink, and therefore as noted previously, the PHR according to the Rel-10 3GPP TS 36.321 is not a practical option for many scenarios.

Accordingly, in one embodiment of the present invention, once the UE receives an SCell activation command, the UE will trigger a PHR when the SCell is ready for use, regardless of whether the SCell is configured with uplink or not (e.g., for an SCell without UL configured, the UE also triggers PHR). Such a PHR could include some modified content to inform the eNB about the SCell status.

One example of this embodiment may include revising the 3GPP TS 36.321 in the following manner to ensure that a Power Headroom Report (PHR) shall be triggered upon SCell activation or upon transmission of a valid CQI or SRS (or any other signal that occurs upon SCell activation):

prohibitPHR-Timer expires or has expired and the path loss has changed more than dl-PathlossChange dB for at least one activated Serving Cell which is used as a pathloss reference since the last transmission of a PHR when the UE has UL resources for new transmission;

periodicPHR-Timer expires;

upon configuration or reconfiguration of the power headroom reporting functionality by upper layers [8], which is not used to disable the function;

an SCell (with configured uplink) is successfully activated; or the UE transmits the first valid CQI or SRS upon SCell activation.

prohibitPHR-Timer expires or has expired, when the UE has UL resources for new transmission, and the following is true in this TTI for any of the actived Serving Cells with configured uplink:

there are UL resources allocated for transmission or there is a PUCCH transmission on this cell, and the required power backoff due to power management (as allowed by P-MPR$_c$ [10]) for this cell has changed more than dl-PathlossChange dB since the last transmission of a PHR when theUE had UL resources allocated for transmission or PUCCH transmission on this cell.

Accordingly, in this example embodiment, the PHR will only be triggered when the SCell is ready, and not upon reception of the SCell activation command. Similarly, in embodiments in which the SCell is not configured for uplink, the UE may report a reference PHR for activation of a UE which is not configured with uplink.

In accordance with the above modified PHR triggering concept, in this example changes are made to the Extended Power Headroom MAC Control Element. The 3GPP TS 36.321 defines the Extended Power Headroom MAC Control Element (shown in FIG. 3) as follows:

$C_i$: this field indicates the presence of a PH field for the SCell with SCellIndex i as specified in [8]. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the associated $P_{CMAX,c}$ field, and V=1 indicates that the associated $P_{CMAX,c}$ field is omitted;

Power Headroom (PH): this field indicates the power headroom level. The length of the field is 6 bits. The reported PH and the corresponding power headroom levels are shown in Table 6.1.3.6-1 (the corresponding measured values in dB can be found in subclause 9.1.8.4 of [9]);

P: this field indicates whether the UE applies power backoff due to power management (as allowed by P-MPR$_c$ [10]). The UE shall set P=1 if the corresponding $P_{CMAX,c}$ field would have had a different value if no power backoff due to power management had been applied;

$P_{CMAX,c}$: if present, this field indicates the $P_{CMAX,c}$ or $\tilde{P}_{CMAX,c}$ [2] used for calculation of the preceding PH field. The reported $P_{CMAX,c}$ and the corresponding nominal UE transmit power levels are shown in Table 6.1.3.6a-1 (the corresponding measured values in dBm can be found in subclause 9.6.1 of [9]).

To use a PHR to indicate successful activation of an SCell as described above, an example of this embodiment revises the Extended Power Headroom MAC CE as shown in FIG. 4, wherein a reserved bit has been replaced by the shaded "I" bit to indicate the "ready" status of the SCell. In this regard, when the PHR is triggered upon SCell activation, a UE sets the "I" bit in the first octet of the PHR to "1" so that the eNB understands that the PHR is triggered due to SCell activation. Conversely, a PHR in which the "I" bit in the first octet is "0" will not indicate activation of a SCell.

Turning now to FIG. 5a, an example embodiment for enhanced secondary cell activation is shown, in which a PHR report is used to align the SCell activation knowledge of the network with the SCell activation knowledge of a UE. FIG. 5a illustrates operations performed by a method, apparatus and computer program product of an example embodiment from the perspective of an apparatus 200 that may be embodied by or otherwise associated with a UE, such as communication device 102.

In operation 502, the apparatus 200 may include means, such as communication interface 208 or the like, for receiving a secondary cell activation command. Then, in operation 504, the apparatus 200 may include means, such as processing circuitry 202, communication interface 208, or the like, for activating the secondary cell.

Thereafter, in operation 506, the apparatus 200 may include means, such as the processing circuitry 202, the processor 204, or the like, for transmitting a PHR. In one embodiment, the PHR includes information indicating that the PHR was transmitted in response to activation of the secondary cell. In embodiments in which the SCell is not configured with uplink, the apparatus 200 may transmit a reference PHR indicating activation of the SCell.

In one embodiment, the apparatus 200 may further include means, such as communication interface 208, or the like, for receiving an indication that the secondary cell is ready for use. In this regard, the PHR indicates that the secondary cell is active. Moreover, the step of causing the communication device to transmit a signal regarding activation of the secondary cell may be performed in response to receiving the indication that the secondary cell is ready for use.

In another embodiment, the apparatus 200 may further include means, such as communication interface 208, or the like, for receiving a valid channel quality indicator (CQI) or sounding reference signal (SRS). In this regard, the PHR indicates that the secondary cell is active. Moreover, the step of causing the communication device to transmit a signal regarding activation of the secondary cell is performed in response to receiving the indication that the secondary cell is ready for use.

In yet another embodiment, rather than transmitting a PHR to alert the network to activation of the SCell, the UE may estimate in advance how long a non-blind SCell activation will take and report this time period to the eNB. The eNB will react accordingly after the CA is configured. There could be a limited set of activation times (e.g., 8 ms, 12 ms, 16 ms, 20 ms, 24 ms, etc.), and the UE could indicate one of the index. Alternatively, the UE could just indicate the expected activation time in milliseconds (e.g., SCell activation delay=11 ms). However, since UE algorithms for SCell activation are deterministic (provided that the PCell and SCell configurations are known), such an indication could be provided by the UE the first time it is configured with the SCell, and would be applied whenever the SCell is subsequently activated.

This embodiment may be implemented, for example, as a release 12 extension to RRCConnectionReconfigurationComplete, modified in one example as shown below in Table 1. With this approach, the eNB is able to get additional information about the activation delay and can provide more optimal handling of different UE implementations.

TABLE 1

Example addition to RRCConnectionReconfigurationComplete

```
--ASN1START
RRCConnectionReconfigurationComplete ::= SEQUENCE {
    rrc-TransactionIdentifier        RRC-TransactionIdentifier,
    criticalExtensions               CHOICE {
        rrcConnectionReconfigurationComplete-r8
        RRCConnectionReconfigurationComplete-r8-IEs,
            criticalExtensionsFuture     SEQUENCE { }
    }
}
RRCConnectionReconfigurationComplete-r8-IEs ::= SEQUENCE {
    nonCriticalExtension             RRCConnectionReconfigurationComplete-v8a0-IEs
    OPTIONAL
}
RRCConnectionReconfigurationComplete-v8a0-IEs ::= SEQUENCE {
    lateNonCriticalExtension         OCTET STRING
    OPTIONAL,
    nonCriticalExtension             RRCConnectionReconfigurationComplete-v1020-IEs
    OPTIONAL
}
RRCConnectionReconfigurationComplete-v1020-IEs ::= SEQUENCE {
    rlf-InfoAvailable-r10            ENUMERATED {true}
    OPTIONAL,
    logMeasAvailable-r10             ENUMERATED {true}
    OPTIONAL,
    nonCriticalExtension             RRCConnectionReconfigurationComplete-v1130-IEs
    OPTIONAL
}
RRCConnectionReconfigurationComplete-v1130-IEs ::= SEQUENCE {
    connEstFailInfoAvailable-r11  ENUMERATED {true}
    OPTIONAL,
    nonCriticalExtension             RRCConnectionReconfigurationComplete-v12xx-IEs
    OPTIONAL
}
RRCConnectionReconfigurationComplete-v12xx-IEs ::= SEQUENCE {
    SCellActivationDelay-r12   ENUMERATED {ms8, ms12, ms16, ms20, ms24, blind}
    OPTIONAL,
    nonCriticalExtension             SEQUENCE { }
    OPTIONAL
--ASN1STOP
```

FIG. 5b illustrates an example of this embodiment, in which an estimated activation time is used to align the SCell activation knowledge of the network with the SCell activation knowledge of the UE. As with FIG. 5a above, FIG. 5b illustrates operations performed by a method, apparatus and computer program product of an example embodiment from the perspective of an apparatus 200 that may be embodied by or otherwise associated with a UE, such as communication device 102.

In operation 508, the apparatus 200 may include means, such as the processing circuitry 202, the processor 204, or the like, for estimating an expected time period after which the secondary cell will be ready for use. In this regard, once the UE knows the MBSFN configuration, the TDD configuration, etc., of the PCell, it can estimate the expected time period after which the secondary cell will be ready for use. In some embodiment, some of the configuration of the SCell may also be known and used to improve the estimation.

Thereafter, in operation 510 the apparatus 200 may include means, such as communication interface 208, or the like, for transmitting an indication of the estimated expected time period. In this regard, the indication of the expected time period may comprise an index reference to a group of preconfigured time periods or a measurement in units of time (e.g., milliseconds).

Further, the apparatus 200 may include means, such as processing circuitry 202, communication interface 208, or the like, for activating the secondary cell. In this regard, activating the secondary cell may be performed in response to receiving a secondary cell activation command from a network entity.

In some embodiments, operations 508 and 510 may occur prior to receiving a secondary cell activation command or after receiving a secondary cell activation command. Moreover, in one embodiment, the indication of the estimated time period may be transmitted using L1 or MAC signaling, such as, in one example, within the acknowledgment (ACK) sent in response to the activation command.

Another embodiment for enhanced SCell activation is shown with reference to FIG. 6. FIG. 6 illustrates operations performed by a method, apparatus and computer program product of an example embodiment from the perspective of a network entity, such as a link having an access point 104, which may be one of a plurality of network entities connected to a communication device, such as a UE.

In operation 602, the apparatus 200 may include means, such as communication interface 208 or the like, for causing transmission, to the communication device, of a secondary cell activation command requesting activation of a secondary cell connected to the communication device.

In operation 604, the apparatus 200 may include means, such as the communication interface 208 or the like, for receiving a signal regarding activation of the secondary cell. In one embodiment, the signal may comprise a PHR such as that described above in connection with FIG. 5a. In another embodiment, the signal may indicate a time period after which the secondary cell will be active, as described above in connection with FIG. 5b. In these embodiments, as above, the secondary cell need not configured for uplink transmission.

In some embodiments, operation 602 may not be performed prior to operation 604. Additionally, in some embodiments, operation 604 may be performed and operation 602 may not performed. As would be appreciated by one skilled in the art, the invention is not limited to the embodiments shown, and different combinations of functions, as well as alternate ordering, may be utilized in some embodiments.

In operation 606, the apparatus 200 may include means, such as the processing circuitry 202, processor 204, or the like, for determining that the secondary cell is ready for use based on the received signal. Upon determination of readiness of the secondary cell, the network can make use of the early activation, where otherwise the secondary cell might sit idle.

Another issue involves implicit timer based SCell deactivation. According to 3GPP TS 36.321, once a UE receives an activation command MAC CE for the given SCell, the UE will start/restart the sCellDeactivationTimer. However, as noted previously, the activation delay may be long. As a result, it is possible that the SCell cannot be activated at all, because the UE may not be able to receive a PDCCH order before the sCellDeactivationTimer expires. One obvious solution is to always set a longer value for sCellDeactivationTimer. However, this solution will not only generate some dummy value in the current signaling, but may also cause needless power consumption by the UE if an eNB relies on the implicit SCell deactivation mechanism to save UE power.

Accordingly, in one embodiment, deactivation of a secondary cell may be optimized by improving the operation of the sCellDeactivationTimer. The current MAC specification says that the UE will start/restart the sCellDeactivationTimer upon reception of an activation command, and for each received PDCCH for UL grant/DL assignment, it can only restart the timer. However, rather than enabling sCellDeactivationTimer to be started upon reception of an activation command, in this embodiment the UE only restarts the sCellDeactivationTimer upon the reception of activation command, thereby avoiding the issue of delayed activation of the SCell causing expiration of the sCellDeactivationTimer prior to activation of the SCell. Instead, the UE may start (or restart) the sCellDeactivationTimer upon PDCCH for UL grant/DL assignment, which does not pose the same risk of expiration due to a long activation delay.

For instance, in one example the 3GPP TS 36.321 may be revised in the following manner for each transmission time interval (TTI) and for each configured SCell:
  if the UE receives an Activation/Deactivation MAC control element in this TTI activating the SCell, the UE shall in the TTI according to the timing defined in [2]:
    activate the SCell; i.e. apply normal SCell operation including:
      SRS transmissions on the SCell;
      CQI/PMI/RI/PTI reporting for the SCell;
      PDCCH monitoring on the SCell;
      PDCCH monitoring for the SCell
    restart the sCellDeactivationTimer associated with the SCell;
  else, if the UE receives an Activation/Deactivation MAC control element in this TTI deactivating the SCell; or
  if the sCellDeactivationTimer associated with the activated SCell expires in this TTI:
    in the TTI according to the timing defined in [2]:
      deactivate the SCell;
      stop the sCellDeactivationTimer associated with the SCell;
      flush all HARQ buffers associated with the SCell.
  if PDCCH on the activated SCell indicates an uplink grant or downlink assignment; or if PDCCH on the Serving Cell scheduling the activated SCell indicates an uplink grant or a downlink assignment for the activated SCell:
start or restart the sCellDeactivationTimer associated with the SCell;

Accordingly, an example of this embodiment is illustrated in FIG. 7, in which an implicit SCell deactivation timer operates more accurately. FIG. 7 illustrates operations performed by a method, apparatus and computer program product of an example embodiment from the perspective of an apparatus 200 that may be embodied by or otherwise associated with a UE, such as communication device 102.

In operation 702, the apparatus 200 may include means, such as communication interface 208 or the like, for receiving a secondary cell activation command.

Then, in operation 704, the apparatus 200 may include means, such as processing circuitry 202, communication interface 208, or the like, for activating the secondary cell.

In operation 706, the apparatus 200 may include means, such as the communication interface 208, or the like, for receiving a physical downlink control channel (PDCCH) order for an uplink grant or a downlink assignment.

Thereafter, in operation 708, the apparatus 200 may include means, such as the communication interface 208, or the like, for causing the communication device to start a secondary cell deactivation timer associated with the secondary cell in response to receiving the PDCCH order.

In some embodiments, the apparatus 200 may further include means, such as the processing circuitry 202, processor 204, or the like, for restarting the secondary cell deactivation timer in response to receiving a subsequent secondary cell activation command or a subsequent PDCCH order for an uplink grant or a downlink assignment.

By only starting the deactivation timer in response to reception of a PDCCH order, this embodiment avoids the possibility of pre-emptive deactivation of the SCell in instances where SCell activation takes a long time.

As described above, embodiments of the present invention provide a method and apparatus to enhance the efficiency with which the network and UE can use early-activating secondary cells. As a result, embodiments of the present invention align the understandings of both the eNB and the UE regarding when the SCell is ready for use, so early activation will bring benefits for both eNB and UE. In addition, a shorter value for sCellDeactivationTimer enables the eNB to rely on the implicit SCell deactivation mechanism to deactivate the SCell, which is good for limiting UE power consumption.

Given the additional delays which may occur in SCell activation compared that those which were first envisaged for rel-10 carrier aggregation, a risk has emerged that SCell deactivation will not be used. However, by providing further visibility to the eNB of the actual UE activation performance (rather than the generic delays considering worst case configurations), embodiments of the present invention make it more attractive for networks to perform SCell deactivation and provide benefits for UE power consumption.

As noted above, FIGS. 5a, 5b, 6, and 7 are flowcharts illustrating the operations performed by a method, apparatus and computer program product, such as apparatus 200 of FIG. 2, from the perspective of the mobile terminal 102 and a network entity, such as the access point 104, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 206 of an apparatus employing an embodiment of the present invention and executed by a processor 204 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 5a, 5b, 6, and 7, when executed, convert a computer or processing circuitry into a particular machine configured to perform an example embodiment of the present invention. Accordingly, the operations of FIGS. 5a, 5b, 6, and 7 define algorithms for configuring a computer or processing circuitry 202, e.g., processor, to perform example embodiments. In some cases, a general purpose computer may be provided with an instance of the processor which performs the algorithms of FIGS. 5a, 5b, 6, and 7 to transform the general purpose computer into a particular machine configured to perform the example embodiments.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments, additional optional operations may optionally be included as shown, for example by the dashed lines in FIG. 2. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
causing a user equipment to activate a secondary cell, wherein the user equipment is connected to a primary cell and the secondary cell;
causing the user equipment to determine an estimated expected time period after which the secondary cell will be ready for use,
wherein the estimated expected time period is determined based at least in part on a configuration of the primary cell and a configuration of the secondary cell; and
causing the user equipment to transmit, to a network entity, a signal comprising an indication of the estimated expected time period after which the secondary cell will be ready for use, wherein the secondary cell is ready for use a time period after the user equipment activates the secondary cell.

2. The method according to claim 1, further comprising:
causing the user equipment to transmit a power headroom report (PHR) and information indicating that the PHR was transmitted in response to completion of activation of the secondary cell.

3. The method according to claim 1, further comprising:
receiving an indication that the secondary cell is ready for use, wherein a power headroom report (PHR) indicates that the secondary cell is active.

4. The method according to claim 2, further comprising:
transmitting a valid channel quality indicator (CQI) or sounding reference signal (SRS),
wherein the PHR indicates that the secondary cell is active, and wherein the step of causing the user equipment to transmit the signal is performed in response to transmitting the valid CQI or SRS.

5. The method according to claim 1, wherein determining the estimated expected time period is performed either prior to or in response to receiving a secondary cell activation command.

6. The method according to claim 1, wherein causing the user equipment to transmit the signal is performed prior to receiving a secondary cell activation command.

7. The method according to claim 1, wherein the indication of the expected time period comprises an index reference to a group of preconfigured time periods.

8. The method according to claim 1, wherein the indication of the expected time period comprises a measurement in units of time.

9. The method according to claim 1, wherein the user equipment comprises a mobile phone.

10. An apparatus for use with a communication device connected to a primary cell and at least one secondary cell, the apparatus comprising at least one processor and at least one memory including computer program code, the at least one memory and the computer program code configured to, with the at least one processor, cause the communication device to:
activate a secondary cell;
determine an estimated expected time period after which the secondary cell is ready for use based at least in part on a configuration of the primary cell and a configuration of the secondary cell; and
transmit, to a network entity, a signal comprising an indication of the estimated expected time period after which the secondary cell is ready for use, wherein the secondary cell is ready for use a time period after the communication device activates the secondary cell.

11. A method comprising:
receiving, by a network entity from a user equipment, a signal comprising an indication of an estimated expected time period after which a secondary cell will be ready for use,
wherein the estimated expected time period is determined based at least in part on a configuration of a primary cell and a configuration of the secondary cell;
determining that the secondary cell is ready for use based on the received signal; and
using, by the network entity, an early activation of the secondary cell based on the determination that the secondary cell is ready for use.

12. The method according to claim 11, wherein the signal is received in response to the user equipment transmitting a valid channel quality indicator (CQI) or sounding reference signal (SRS).

13. The method according to claim 11, wherein the signal is received prior to transmission of a secondary cell activation command.

14. The method according to claim 11, wherein the signal is received after transmission of a secondary cell activation command.

15. The method according to claim 11, wherein the indication of the expected time period comprises an index reference to a group of preconfigured time periods or an estimate in units of time.

16. The method according to claim 1, wherein the network entity comprises at least one of an evolved Node B (eNB), a base station, a link, or an access point.

17. The method according to claim 8, wherein the units of time are milliseconds.

18. The method according to claim 11, wherein the network entity comprises at least one of an evolved Node B (eNB), a base station, a link, or an access point.

* * * * *